UNITED STATES PATENT OFFICE.

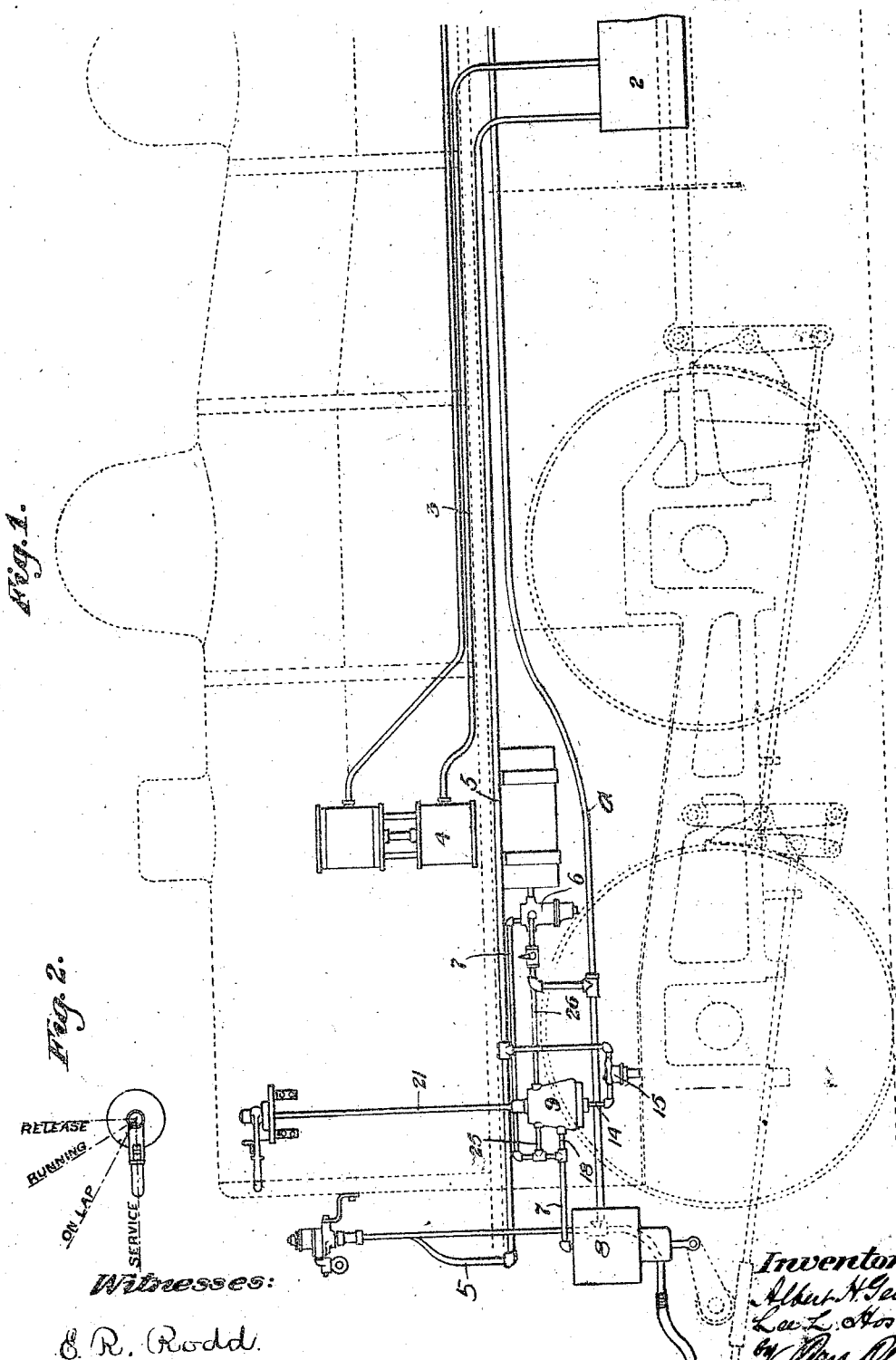

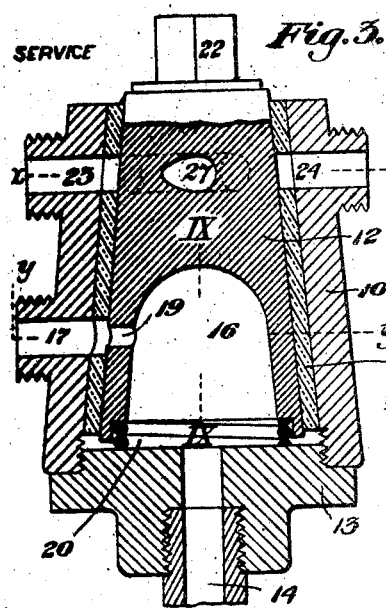
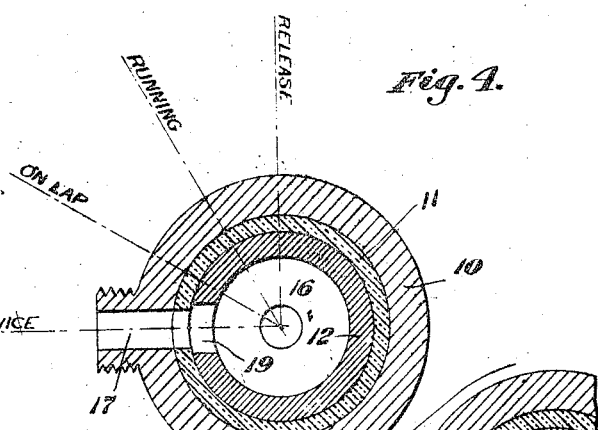
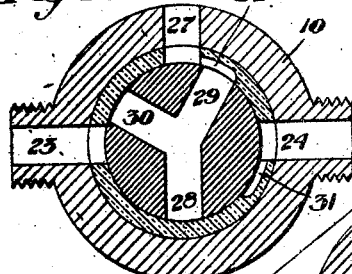
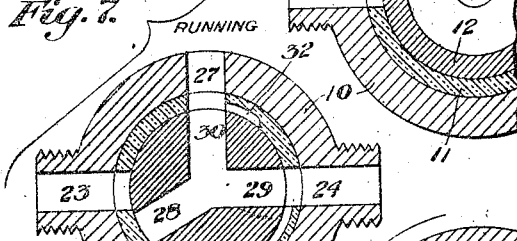
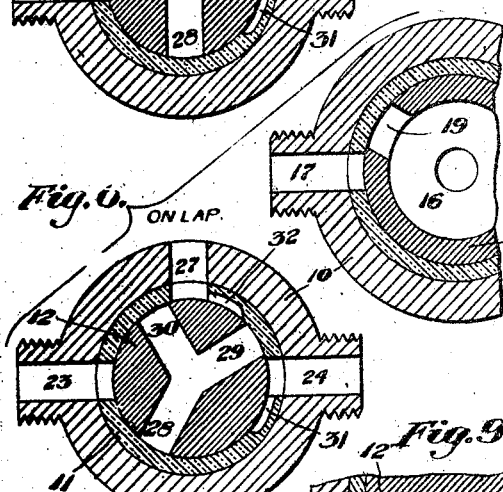
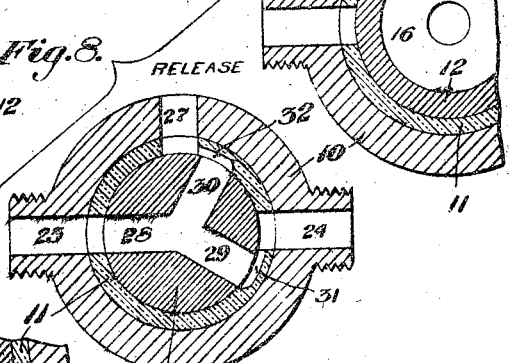
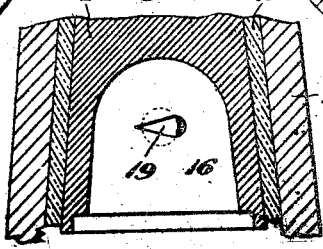

ALBERT H. GELTZ, OF ALLIANCE, AND LEE L. HOSACK, OF YOUNGSTOWN, OHIO, ASSIGNORS TO C. B. McLEAN, OF PITTSBURG, PENNSYLVANIA.

AIR-BRAKE APPARATUS.

No. 852,949.     Specification of Letters Patent.     Patented May 7, 1907.

lication filed April 1, 1905. Serial No. 253,341.

*To all whom it may concern:*

Be it known that we, ALBERT H. GELTZ and LEE L. HOSACK, citizens of the United States, residing at Alliance and Youngstown, in the counties of Stark and Mahoning and State of Ohio, have invented certain new and useful Improvements in Air-Brake Apparatus, of which the following is a specification, reference being had therein to the accompanying drawing, forming part of the specification, in which—

Figure 1. is a partial view of a locomotive air brake equipment provided with our improved locomotive brake valve. Fig. 2. is a diagrammatic plan view of the operating handle, indicating the various positions. Fig. 3. is a vertical sectional view through the valve in "service" position. Fig. 4. is a horizontal sectional view on the line y, y, of Fig. 3 showing the valve plug port in full registering position for a "service" application of the brake cylinder independent of the triple valve. Fig. 5. is a similar corresponding section on the line x, x, of Fig. 3 showing the exhaust connection from the triple valve, the exhaust port leading to the atmosphere and the exhaust port leading from the brake cylinder, with the transverse ports of the plug is relation thereto in "service" position. Fig. 6. represents sectional views on the lines x, x, and y, y, respectively of Fig. 3 showing the "lap" position of the valve, all the ports being blanked. Fig. 7. is a similar view showing the valve in "running" position, the brake apparatus being charged and ready for an application. Fig. 8. are corre- corresponding views of the valve in "release" position, allowing for the direct passage of air from the brake cylinder to the atmosphere in- dependent of the triple and direct passage also from the triple exhaust to provide for a quick release of the locomotive brake cylinder. Fig. 9. is a partial vertical section of Fig. 3 on the line IX. IX. thereof.

Our invention relates to improvements in air brakes, and it has for its object to provide a valve mechanism whch will control the locomotive brake cylinder independent of the usual triple valve, but which will also co-operate with it at all times.

The objects of the invention are to provide a device whereby the comotive brake cylin- der may be controlled independent of the triple valve and the engineer's brake valve of the system, and which will operate the locomotive brake cylinder, either alone or in conjunction with these parts. The device is designed to exhaust pressure from the locomotive brake cylinder without disturb- ing the train brakes and to also re-apply the locomotive brake by admission of air to the cylinder thereof without interfering with the ordinary operation of the train brakes. Also to provide for the release of the tender and train brakes entirely independent of the locomotive brake while said brake is main- tained in operation. Also to provide for the exhaust from the triple valve through our improved valve mechanism so that the train brakes may be released while pressure is re- tained on the locomotive brake cylinder. Also to provide for the application of the train brakes in full release position, while preventing the charging of the locomotive and tender brake cylinder. Also to provide for the maintaining of the pressure in the locomotive brake cylinder in "lap" position, retaining the locomotive brakes set while the train brakes are being released, and for pro- viding for the use of the train brakes in "run- ning" position in the ordinary way. Also to provide a construction wherein the ports from the locomotive brake cylinder may communicate with the atmosphere so that when the train brakes are applied by the engineer's valve the air will flow back and cause a blow to the atmosphere thus notify- ing the engineer that his locomotive brake is not applying and to move it to running position so that the brakes will apply in the usual manner.

Referring now to the drawings, 2 is the main reservoir of the system, to which air is supplied by the usual pipe 3 from pump 4 and from which it is delivered by main reser- voir pipe 5 to the system.

6 is the triple valve by which the reduction is made in the train pipe side to apply the brakes of the train system, and which is con- nected by pipe 7 with brake cylinder 8 by the piston of which the locomotive brakes are applied, the triple valve 6 being also connect- ed with train pipe a in the usual way.

9 is our improved combination valve con- sisting of an outer case 10 of coniform or other shape preferably provided with a bush- ing 11, although the bushing is not abso- lutely necessary, and having a rotatable valve plug 12. The lower portion of the valve case is closed by a base plug 13 with which connects a supply pipe 14 communicating with the air supply pipe 5 leading from the main reservoir or other source of fluid pressure, preferably provided with an intervening reducing valve 15. The lower portion of plug 12 is preferably made hollow in the interior by providing a central cavity 16, at all times in communication with pipe 14, or the plug may be made in any other suitable manner as by means of an annular port adapted to provide constant communication with the pressure supply pipe.

17 is a port leading outwardly at one side of the valve case and communicating by connection 18 with pipe 7 leading to the locomotive cylinder 8 whereby independent pressure may be admitted thereto from the hollow interior 16 of the plug through a registering port 19 perforating the wall thereof, and preferably tapered at one side as shown in Fig. 9, so as to provide for a gradual application of the air. The plug 12 is held upwardly to its seat in any suitable manner as by proper fitting or by a pressure device such as a spring 20, and the valve is rotated by means of a rod 21 connected with the valve in any suitable manner as by engaging a terminal nut 22, or otherwise. It will thus be seen that when the valve is in "service" position a gradual application of the locomotive brake may be made by varying the amount of air through the port 19, corresponding to the stop made in slowing up for a station usually made by gradual reduction of the train pipe pressure for securing the same effect.

The upper portion of the valve shell 10 is provided with exhaust port 23 leading from the locomotive brake cylinder and oppositely arranged port 24 leading from the exhaust port or triple valve 6, with which these ports are connected by pipes 25 and 26 respectively. An outlet opening 27 communicating with the atmosphere is located about midway of said ports 23 and 24 and preferably on the same level therewith. The corresponding upper portion of plug 12 is provided with registering and communicating transverse ports 28, 29 and 30 adapted to establish communication between said exhaust ports and the atmosphere in various positions of the valve, as indicated in the drawings. It will be seen that the "service" application of the locomotive brakes may thus be made by the operation of the valve plug 12 independent of the triple valve and the usual accompanying operative parts of the system, and that when the valve plug is in the other positions, as "lap", "running" and "release", said valve, as to port 19, will be inoperative for the purpose of admitting pressure to the brake cylinder. We have therefore provided means, to wit, the secondary ports 23, 24 and 27, and the transverse ports 28, 29 and 30, whereby the valve may be used in co-operation with the usual system so as to provide for communication from the triple valve to the brake cylinder and exhaust therefrom through our improved valve to the atmosphere. In order to provide for communication of ports 29 and 30 with ports 24 and 27 in "release" position, the bushing 11 is cut out as indicated at 31 and 32. Corresponding communicating ports may be made in the plug itself, if preferred, or registering communication may be provided in any other suitable manner.

By this construction it will be seen that our valve is capable of accomplishing the various functions above referred to while a further advantage is that when the valve is thrown to the full release position of Fig. 8 regardless of whether the brakes are set or not, the triple exhaust port and the locomotive brake cylinders are in direct communication with the atmosphere, thus making it impossible for the brakes to creep on or become set for any local cause, as for instance leaks in the train line causing a reduction of pressure. By our improved valve we are able to set and release the locomotive brakes at any time either with a direct pressure through said valve, or with the automatic operation, utilizing the triple valve in the usual way. That is, we may release the locomotive brake with straight air and re-set with straight air at any time without interfering with or using the automatic valve, while still providing for the full complete application of the train brakes and the locomotive brake by the automatic operation.

A particular advantage of the independent operation of the locomotive brake cylinder is that in case of "skidding" or sliding of the locomotive wheels, causing flattening, the brakes may be released and instantly re-applied, taking a new hold, and the pressure may be likewise retained on the locomotive brakes independent of the train brakes, as has been stated.

The advantages of our invention will be fully appreciated by all those familiar with air brake construction or practice, as it places the engineer in control of the locomotive brakes entirely independent of the train system while the various advantages incident to the operation of the system as a whole are present as has been set forth.

Various changes or modifications may be made in the construction of the valve itself as to the air ports and their arrangement or design, as well as the manner of incorporating the valve with the system, but all such changes are to be considered as within the scope of the following claims.

What we claim is:

1. The combination with a brake cylinder provided with a supply and exhaust pipe communicating with a triple valve; of an independent valve adapted to establish communication between reservoir pressure and the brake cylinder and provided with ports adapted to communicate with the exhaust from the brake cylinder and triple valve respectively and with the atmosphere.

2. The combination with a brake cylinder provided with a supply and exhaust pipe communicating with a triple valve; of an independent valve adapted to establish communication between the main reservoir pressure and the brake cylinder and provided with ports adapted to communicate with the exhaust from the brake cylinder and triple valve respectively and with the atmosphere, substantially as set forth.

3. The combination with a locomotive brake cylinder, a reservoir containing compressed fluid, and a triple valve; of a valve case communicating with the fluid of the reservoir and with the locomotive brake cylinder, a rotatable valve therein in constant communication with said fluid pressure and adapted to establish pressure to the locomotive brake cylinder, and provided with independent exhaust ports adapted to communicate with the exhaust from the brake cylinder, triple valve, and with the atmosphere.

4. The combination with a locomotive brake cylinder, a main reservoir, and a triple valve; of an independent valve having an apertured plug in constant communication with main reservoir pressure and provided with a tapered port adapted to establish communication with the brake cylinder, substantially as set forth.

5. In an air brake system, the combination of a fluid reservoir, an engineer's valve, a driver brake cylinder and its triple valve, piping connecting these parts, and control valve mechanism connected to the driver brake cylinder, to the triple valve exhaust port, and to the fluid reservoir, and arranged to open the triple valve exhaust port to the atmosphere or close the same, to open the brake cylinder to the atmosphere or keep the same closed, and to connect the brake cylinder to the fluid reservoir.

6. In an air brake system, the combination of a fluid reservoir, an engineer's valve, a driver brake cylinder and its triple valve, piping connecting these parts, and control valve mechanism connected to the driver brake cylinder, to the triple valve exhaust port, and to the fluid reservoir, and arranged by the manipulation of a single handle and in different positions to open the triple valve exhaust port to the atmosphere or keep it closed, to open the brake cylinder to the atmosphere or keep the same closed, and to connect the brake cylinder to the fluid reservoir.

7. A valve case communicating with main reservoir pressure and with the locomotive brake cylinder, a rotatable valve therein in constant communication with main reservoir pressure and adapted to establish pressure to the locomotive brake cylinder, and provided with independent exhaust ports adapted to communicate with the exhaust from the brake cylinder, triple valve, and with the atmosphere, substantially as set forth.

8. A valve case communicating with main reservoir pressure and with the locomotive brake cylinder, a rotatable valve therein in constant communication with main reservoir pressure and adapted to establish pressure to the locomotive brake cylinder, and provided with independent exhaust ports adapted to communicate with the exhaust from the brake cylinder, triple valve, and with the atmosphere, with means for setting the valve at various positions, substantially as set forth.

9. In an air brake system, the combination of a main reservoir, an engineer's valve, a driver brake cylinder and its triple valve, piping connecting these parts, and control valve mechanism connected to the driver brake cylinder, to the triple valve exhaust port, and to the main reservoir, and arranged to open the triple valve exhaust port to the atmosphere or close the same, to open the brake cylinder to the atmosphere or keep the same closed, and to connect the brake cylinder to the main reservoir.

10. In an air-brake system, the combination of an engineer's valve, a main reservoir, a driver brake cylinder and its triple valve, piping connecting these parts, and control valve mechanism connected to the driver brake cylinder, to the triple valve exhaust port, and to the main reservoir, and arranged by the manipulation of a single handle and in different positions to open the triple valve exhaust port to the atmosphere or keep it closed, to open the brake cylinder to the atmosphere or keep the same closed, and to connect the brake cylinder to the main reservoir.

11. In air brake apparatus, valve mechanism including a casing having ports adapted to communicate respectively with the main reservoir, the driver brake cylinder, and the release port of a triple valve on a locomotive, and having other ports adapted to communicate with the atmosphere, and a valve arranged to put either the brake cylinder port or the release port of the triple valve into communication with the atmosphere or to keep both of said ports closed, or to connect the main reservoir port with the brake cylinder port.

12. In air brake apparatus, valve mechanism including a casing having ports adapted to communicate respectively with a fluid reservoir, the driver brake cylinder, and the release port of a triple valve on a locomotive, and having other ports adapted to communicate with the atmosphere, and a valve arranged to put either the brake cylinder port or the release port of the triple valve into communication with the atmosphere or to keep both of said ports closed, or to connect the fluid reservoir port with the brake cylinder port.

In testimony whereof we affix our signature in presence in two witnesses.

ALBERT H. GELTZ.
LEE L. HOSACK.

Witnesses:
C. M. CLARKE,
J. M. CORBOY.